(12) United States Patent
Lee et al.

(10) Patent No.: US 8,410,750 B2
(45) Date of Patent: Apr. 2, 2013

(54) METHOD FOR SOLAR POWER ENERGY MANAGEMENT WITH INTELLIGENT SELECTION OF OPERATING MODES

(75) Inventors: Hsiao-Yi Lee, Hsinchu County (TW); Yu-Jen Liu, Kaohsiung (TW); Yu-Nan Liu, Kaohsiung (TW)

(73) Assignee: National Kaohsiung University of Applied Sciences, Kaohsiung (TW)

( * ) Notice: Subject to any disclaimer, the term of this patent is extended or adjusted under 35 U.S.C. 154(b) by 197 days.

(21) Appl. No.: 13/081,558

(22) Filed: Apr. 7, 2011

(65) Prior Publication Data
US 2012/0256581 A1 Oct. 11, 2012

(51) Int. Cl.
*H02J 7/00* (2006.01)
*H01M 10/44* (2006.01)
*H01M 10/46* (2006.01)
(52) U.S. Cl. .......................................... 320/101; 307/66
(58) Field of Classification Search .................. 320/101
See application file for complete search history.

(56) References Cited

U.S. PATENT DOCUMENTS

| 6,914,418 | B2 * | 7/2005 | Sung ............................. 320/140 |
| 7,157,810 | B2 * | 1/2007 | Kanouda et al. ................ 307/66 |
| 7,456,507 | B2 * | 11/2008 | Yang ............................. 257/797 |
| 7,456,604 | B2 * | 11/2008 | Kurokami et al. ............ 320/101 |
| 2008/0084178 | A1 * | 4/2008 | Dowd et al. .................. 320/101 |
| 2010/0327813 | A1 * | 12/2010 | Bucur et al. .................. 320/134 |

\* cited by examiner

*Primary Examiner* — Ramy Ramadan
(74) *Attorney, Agent, or Firm* — Bacon & Thomas, PLLC

(57) ABSTRACT

A method for solar power energy management with intelligent selection of operating modes classifies the power energy of a solar cell and an reserved power of a rechargeable battery into multiple power level ranges, and determine to supply power to a load in accordance with various combinations of the power level ranges of the solar cell and the rechargeable battery to avoid energy waste. When the solar cell is in a "sufficient" power level range, the power energy of the solar cell is simultaneously supplied to the load and stored in the rechargeable battery. When the solar cell is in an "insufficient" power level range, all the power energy of the solar cell is selectively supplied to the load or charged to the rechargeable battery. When being in a "poor" power level range, the power energy of the solar cell can still be charged to the rechargeable battery.

15 Claims, 5 Drawing Sheets

METHOD FOR SOLAR POWER ENERGY MANAGEMENT WITH INTELLIGENT SELECTION OF OPERATING MODES

BACKGROUND OF THE INVENTION

1. Field of the Invention

The present invention relates to a method for solar power energy management, and more particularly to a method for solar power energy management with intelligent selection of operating modes taking factors of power supply condition of a solar cell, power consumption of a load and power storage of a rechargeable battery into account.

2. Description of the Related Art

When regular solar cells perform photovoltaic conversion, they easily confront low photovoltaic conversion efficiency and limited power generation dependent upon sunshine intensity. To cope with the above drawbacks, some relevant measures, such as a sun tracking method that automatically keeps a solar cell at its maximum sunshine intensity at all time so as to generate maximum power, are addressed.

Besides being costly, such maximum power tracking method must be applied to an adequate position for mounting. When sunlight intensity turns weak, the photovoltaic conversion system is unable to efficiently utilize the solar energy. The load of the photovoltaic conversion system is constant and needs a stable power supply. Due to insufficient solar energy, the solar cell stops supplying power to the load while other backup power source having sufficient power is switched to supply power for normally operating the load.

If the solar cell does not supply power directly to the load, conventionally, the solar power utilization method first stores power to a rechargeable battery and supplies the power from the rechargeable battery to the load when needed. Such solar power utilization is so inflexible that the generated power fails to be effectively allocated and the resulting solar energy utilization efficiency is low. Currently, solar energy is used only when the sunshine intensity is high. However, solar energy is not effectively utilized when the sunshine intensity is medium or low. In a time of intensifying energy shortage, energy waste must be stopped and an enhanced solar energy utilization needs to be developed.

SUMMARY OF THE INVENTION

An objective of the present invention is to provide a method for solar power energy management with intelligent selection of operating modes, taking factors of power supply condition of a solar cell, power consumption of a load and power storage of a rechargeable battery into account.

To achieve the foregoing objective, the method for solar power energy management with intelligent selection of operating modes has steps of:

creating a power level range classification to classify a power energy generated by a solar cell and a reserved power stored in a rechargeable battery into multiple power level ranges, wherein the power energy of the solar cell is classified into four power level ranges represented by "poor", "insufficient", "moderate" and "sufficient", and the reserved power of the rechargeable battery is classified into three power level ranges represented by "low", "medium" and "high";

detecting and determining if the power energy of the solar cell is higher than a rated power required by a load;

if the power energy of the solar cell is higher than the rated power of the load, executing an intelligent power supply procedure to simultaneously supply power to the load from the solar cell and charge the rechargeable battery with a residual power of the solar cell;

if the power energy of the solar cell is not higher than the rated power of the load, determining if the power energy of the solar cell falls within the "insufficient" power level range;

if the power energy of the solar cell is in the "insufficient" power level range, determining if the power energy of the solar cell is sufficient to supply the rated power of the load, if positive, supplying all power energy of the solar cell to the load, and if negative, supplying all power energy of the solar cell to the rechargeable battery; and if the power energy of the solar cell is in the "poor" power level range, detecting the reserved power of the rechargeable battery and determining if the reserved power is sufficient to supply the rated power of the load, and if the reserved power is sufficient to supply the rechargeable battery, supplying the reserved power of the rechargeable battery to the load by pulse width modulation.

The power energy of the solar cell and the reserved power of the rechargeable battery are respectively divided into multiple power level ranges. Based on the power level ranges in which the power energy of the solar and the reserved power of the rechargeable battery fall, the power energy of the solar cell with a determined power level range is supplied to the load to normally operate the load. Additionally, a residual power of the solar cell after the power energy of the solar cell is supplied to the load or a smaller power energy of the solar cell generated can be stored in the rechargeable battery so that the power energy of the solar cell is highly utilized to avoid energy waste.

Other objectives, advantages and novel features of the invention will become more apparent from the following detailed description when taken in conjunction with the accompanying drawings.

DETAILED DESCRIPTION OF THE INVENTION

Figure 1:
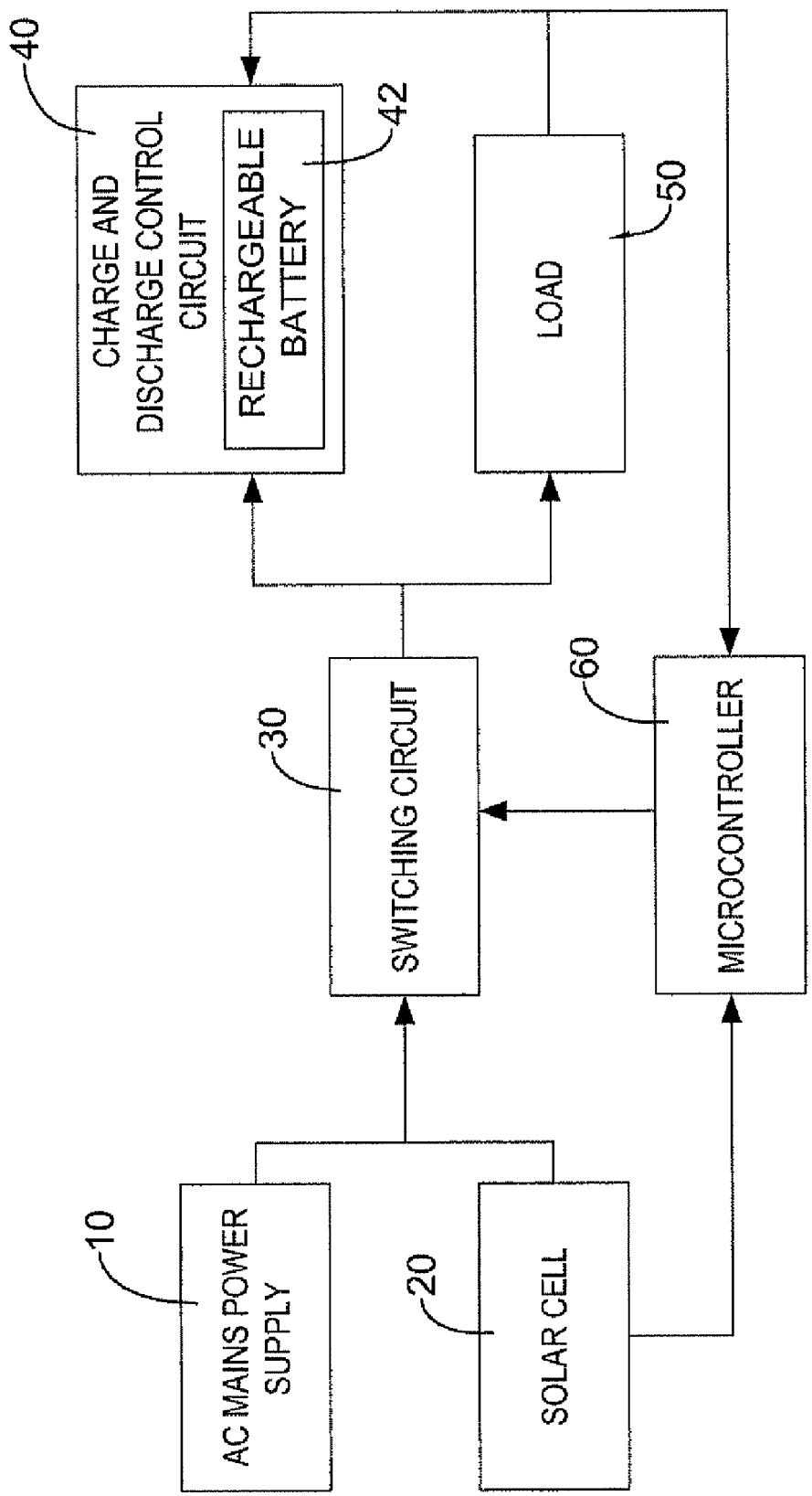
FIG. 1 is a functional block diagram of a system performing a method for solar power energy management with intelligent selection of operating modes in accordance with the present invention.

With reference to FIG. 1, a method for solar power energy management with intelligent selection of operating modes in accordance with the present invention can be applied to a solar energy system. The solar energy system has an AC mains power supply 10, a solar cell 20, a switching circuit 30, a load 50, a charge and discharge control circuit 40 and a microcontroller 60.

The AC mains power supply 10 serves as a backup power and supplies a stable power when solar power generated by the system or power stored in the system is low.

The solar cell 20 performs a photovoltaic conversion to convert received sunlight into DC voltage.

The switching circuit 30 is connected to the AC mains power supply 10, the solar cell 20 and the load 50, and selects one of the AC mains power supply 10 and the solar cell 20 to supply power to the load 50 in accordance with a control signal.

The charge and discharge control circuit 40 is connected to the switching circuit 30 and the load 50, and comprises a rechargeable battery 42. When the solar cell 20 still has power left after supplying power to the load 50, the charge and discharge control circuit 40 stores the residual power in the rechargeable battery 42. The rechargeable battery 42 is protected from being excessively charged and discharged in the charging process, and may be a lithium battery.

The load 50 is connected to the switching circuit 30 and the charge and discharge control circuit 40 and is a light-emitting diode in this embodiment.

The microcontroller 60 is connected to and detects a voltage signal of each of the AC mains power supply 10, the solar cell 20, the load 50, the switching circuit 30 and the charge and discharge control circuit. The voltage signals include DC voltages converted by the solar cell 20, and a power capacity of the rechargeable battery 42. After acquiring the required voltage signals, the microcontroller 60 controls the switching circuit 30 and the charge and discharge control circuit 40 to proceed a following operating mode.

Figure 2A:
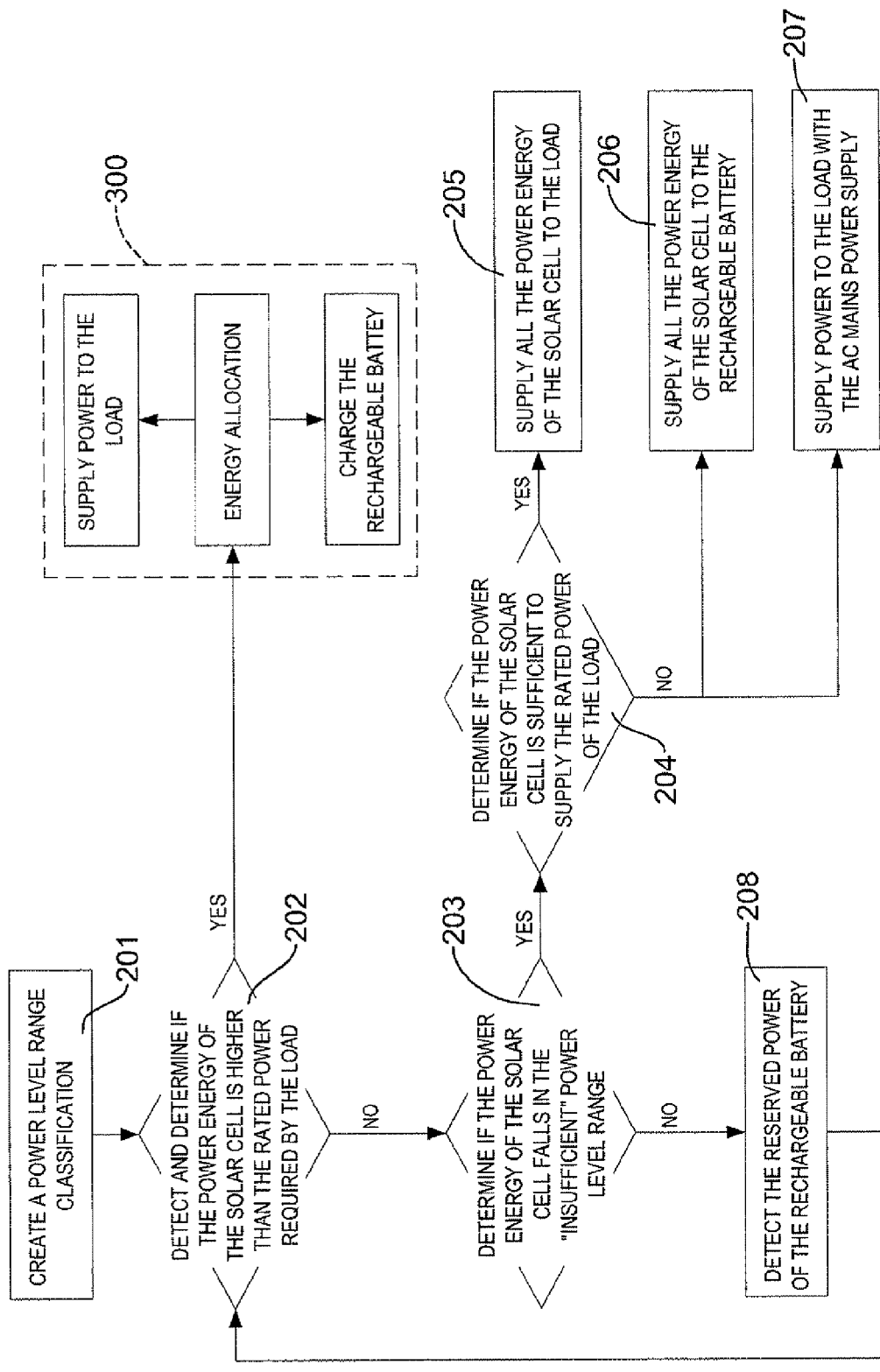
FIGS. 2A and 2B are a flow diagram of a method for solar power energy management with intelligent selection of operating modes in accordance with the present invention.
Figure 2B:
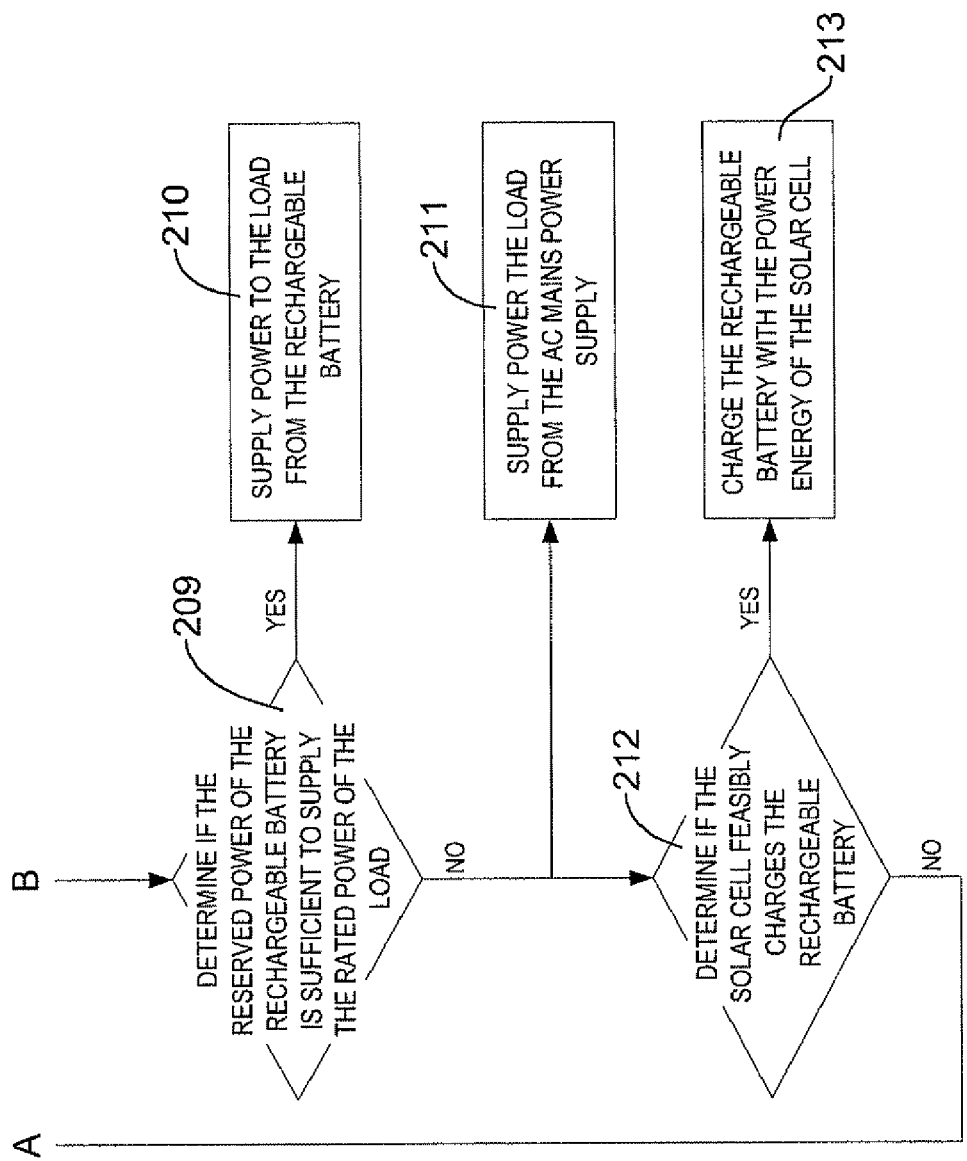

With reference to FIGS. 2A and 2B, a method for solar power energy management with intelligent selection of operating modes in accordance with the present invention has the following steps.

Create a power level range classification (201). The step defines power energy (wattage) generated by the solar cell 20 and the reserved power (ampere-hour) stored in the rechargeable battery 42 with different power level ranges. For example, the power energy (W) of the solar cell 20 can be classified into four power level ranges, namely "poor", "insufficient", "moderate" and "sufficient", and represented by NS, SS, SM, SL respectively. The power level ranges may correspond to a rated power required by the load 50. The four power level ranges are divided by three critical points, 12 W, 15 W and 18 W in the present embodiment. This step further defines the reserved power of the rechargeable battery 42 with different power level ranges. For example, the reserved power of the rechargeable battery 42 can be classified into three power level ranges, namely "low", "medium" and "high", and represented by BS, BM, BL respectively.

Detect and determine if the power energy of the solar cell 20 is higher than the rated power required by the load 50 (202). In the present embodiment, the rated power required by the load 50 is 15 W. When the power energy of the solar cell 20 is greater than 15 W, the power energy will be classified into the "moderate" and "sufficient" power level ranges of the solar cell 20.

Figure 3:
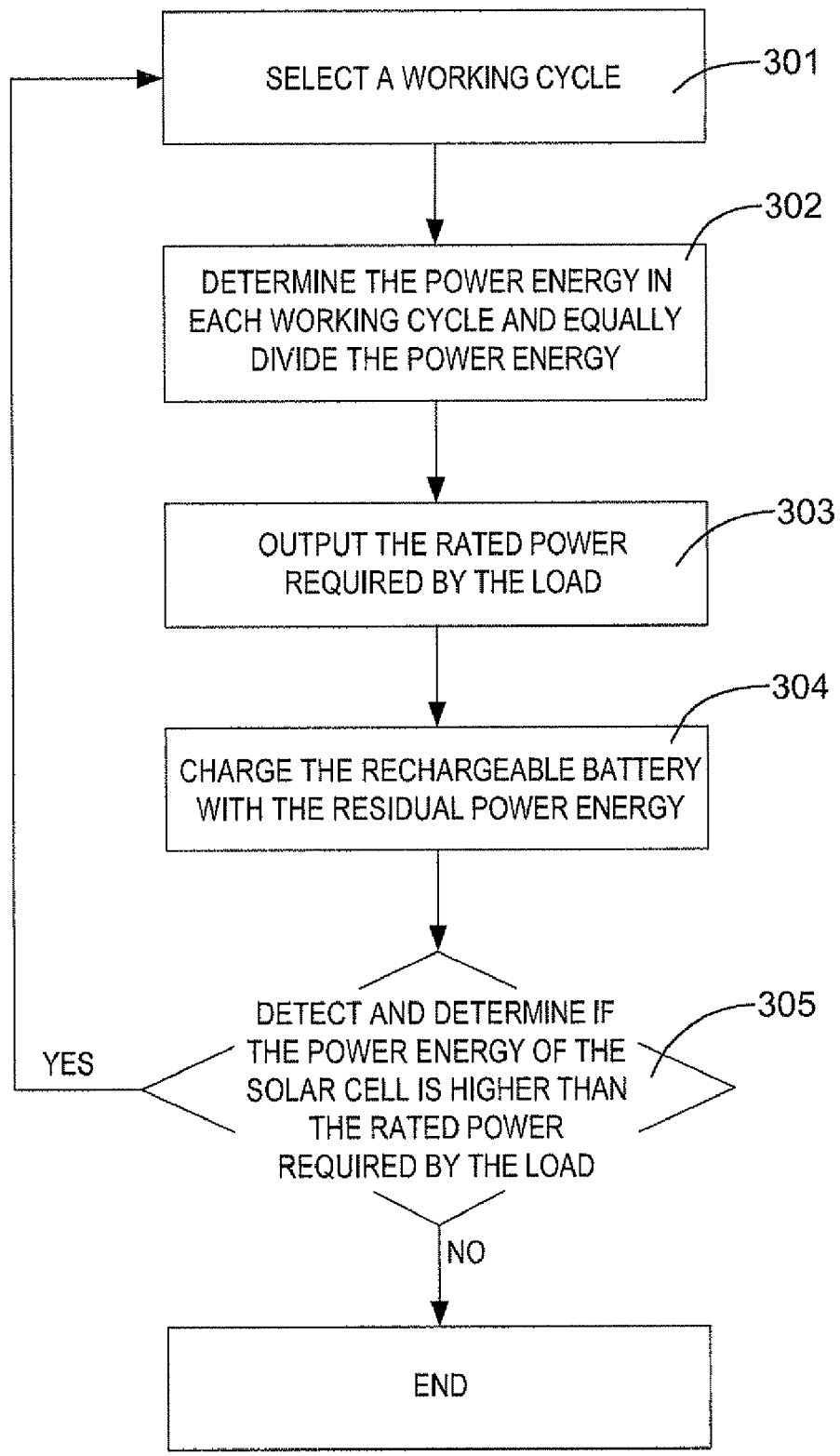
FIG. 3 is a flow diagram of an intelligent power supply procedure of the method for solar power energy management in FIGS. 2A and 2B.

If the power energy of the solar cell 20 is higher than the rated power required by the load 50, execute an intelligent power supply procedure (300) to simultaneously supply power to the load 50 and charge the rechargeable battery 42 with a residual power. With reference to FIG. 3, the intelligent power supply procedure 300 has the following steps.

Select a working cycle (301). As the power energy generated by the solar cell 20 is not a constant value, a fixed cycle needs to be determined, and the power energy of the solar cell 20 can be divided into several sections in accordance with the working cycle. In the present embodiment, the time duration of every 150 Hz is taken as a working cycle.

Determine the power energy in each working cycle and equally divide the power energy (302). As the power energy in each working cycle is not necessarily the same, the total power energy of each working cycle is determined and the total power energy is divided into one hundred equal parts.

Output the rated power required by the load 50 (303). An appropriate portion of power energy in each working cycle is acquired from each working cycle and supplied to the load 50 to meet the operating requirement of the load 50.

Figure 4:
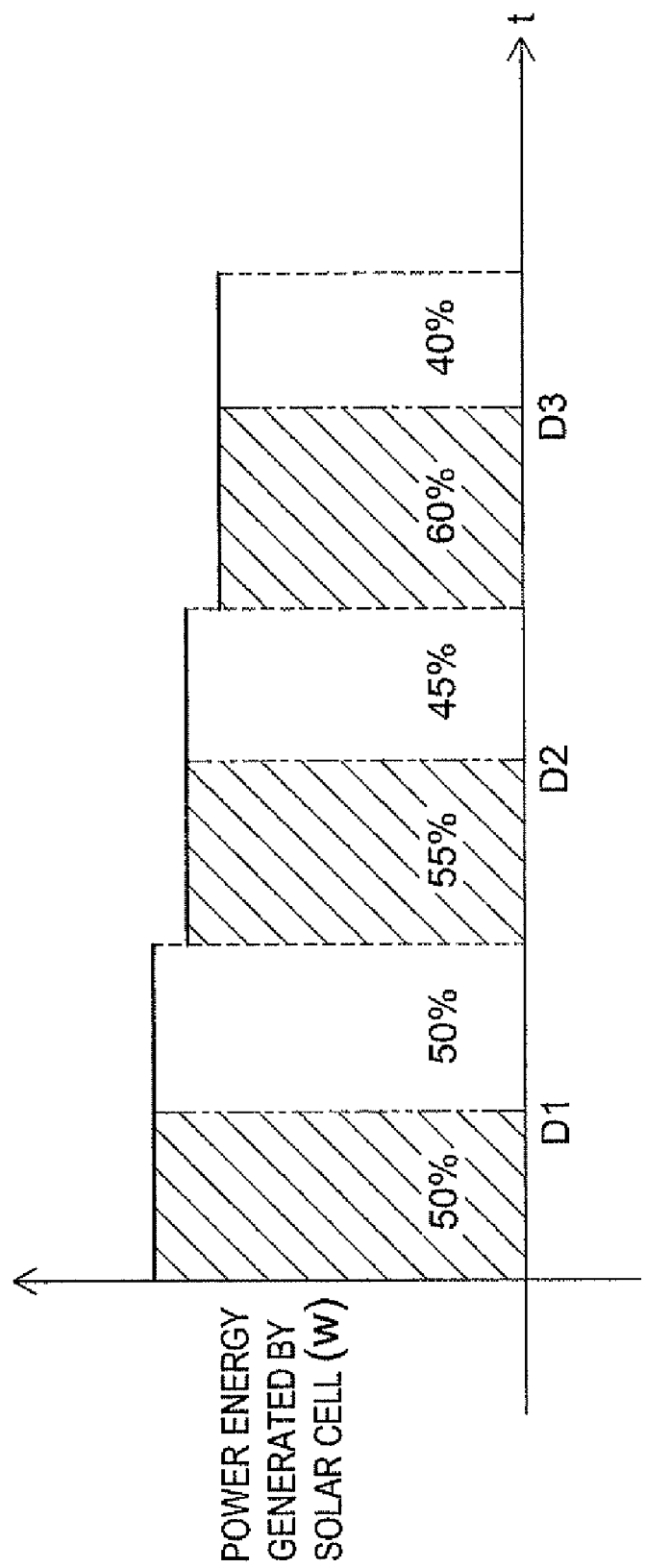
FIG. 4 is a diagram illustrating power in percent allocated by the method for solar power energy management in FIGS. 2A and 2B to a load and to a rechargeable battery.

Charge the rechargeable battery with the residual power energy (304). After the power energy in a working cycle is supplied to the load, the charge and discharge control circuit 40 charges the rechargeable battery 42 with the residual power energy in the same working cycle. In the charging process the pulse width modulation (PWM) technique is employed to perform the charging, and the charging voltage and current are monitored by the charge and discharge control circuit 40 to prevent excessively high voltage or current from damaging the rechargeable battery 42. With reference to FIG. 4, the magnitudes of the power energy (W1, W2 and W3) of the solar cell 20 in three consecutive working cycles D1, D2 and D3 are expressed by W1>W2>W3. Power supplied to the load 50 and charging the rechargeable battery 42 in the three consecutive working cycles are respectively expressed in percent as follows: (D1: load 50%; rechargeable battery 50%); (D2: load 55%; rechargeable battery 45%); (D3: load 60%; rechargeable battery 40%).

Detect and determine the power energy of the solar cell (305). The power energy of the solar cell is further determined if it is still higher than the rated power required by the load 50. If the power energy of the solar cell is still higher than the rated power required by the load, the intelligent power supply procedure (300) can be continuously executed. Otherwise, the intelligent power supply procedure (300) is terminated.

With further reference to FIGS. 2A and 2B, if the determination result of the step (202) is that the power energy of the solar cell 20 is not higher than rated power of the load 50, further determine if the power energy of the solar cell 20 falls in the "insufficient" power level range (203). In the present embodiment, the "insufficient" power level range falls between 12 W and 15 W.

If the power energy of the solar cell 20 is determined to be in the "insufficient" power level range, further determine if the power energy of the solar cell 20 is sufficient to supply the rated power of the load 50 (204). If positive, the charge and discharge control circuit 40 is switched off, and supply all the power energy of the solar cell 20 to the load 50 (205). If negative, supply all the power energy of the solar cell 20 to the rechargeable battery 42 (206), and supply power to the load 50 with the AC mains power supply 10 (207).

If the determination result of the step (203) is negative, it means that the power energy of the solar cell 20 is in the "poor" power level range. In the present embodiment, the power energy of the solar cell 20 is in the "poor" power level range when the power energy is below 12 W; in this case, further detect the reserved power of the rechargeable battery 42 (208).

After detecting the current reserved power of the rechargeable battery 42, determine if the reserved power of the rechargeable battery 42 is sufficient to supply the rated power of the load 50 (209). In the present embodiment, if the reserved power of the rechargeable battery is in the "medium" or "high" power level range, it means that the reserved power of the rechargeable battery is sufficient to supply the rated power required by the load 50. The rechargeable battery 42 employs the PWM technique to supply power to the load 50 (210).

If the determination result of the step (209) is negative, it represents that the rechargeable battery 42 is insufficient to supply the rated power of the load 50, and the AC mains power supply 10 is switched to supply power to the load 50 (211) to stably operate the load 42.

When the power energy of the solar cell 20 falls in the "poor" power level range and the determination result of the step (209) is negative, determine if the solar cell 20 feasibly charges the rechargeable battery (212). There are various factors in consideration of not charging the rechargeable battery 42, such as when the power energy of the solar cell 20 is too low, the temperature of the rechargeable battery 42 is too high, and the like. If the rechargeable battery 42 is determined to have none of the factors, charge the rechargeable battery 42 with the power energy of the solar cell 20 (213). Otherwise, resume step (202).

In sum, the power energy of the solar cell 20 and the reserved power of the rechargeable battery 42 can be respectively divided into multiple power level ranges so that different power level ranges of the solar cell 20 and the rechargeable battery 42 can be combined to correspond to different working modes. Accordingly, the present invention can supply power to the load 50 in accordance with the power level ranges of the solar cell 20 and the rechargeable battery 42 so as to normally operate the load. Additionally, the residual power of the solar cell 20 can be stored in the rechargeable battery so that the utilization rate of the power energy of the solar cell 20 can be significantly enhanced.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for solar power energy management with intelligent selection of operating modes, comprising steps of:
    creating a power level range classification to classify power energy generated by a solar cell and reserved energy stored in a rechargeable battery into multiple power level ranges, wherein the power energy of the solar cell is classified into four power level ranges represented by "poor", "insufficient", "moderate" and "sufficient", and the reserved power of the rechargeable battery is classified into three power level ranges represented by "low", "medium" and "high";
    detecting and determining if the power energy of the solar cell is higher than a rated power required by a load;
    if the power energy of the solar cell is higher than the rated power of the load, executing an intelligent power supply procedure to simultaneously supply power to the load from the solar cell and charge the rechargeable battery with a residual power of the solar cell;
    if the power energy of the solar cell is not higher than the rated power of the load, determining if the power energy of the solar cell falls within the "insufficient" power level range;
    if the power energy of the solar cell is in the "insufficient" power level range, determining if the power energy of the solar cell is sufficient to supply the rated power of the load, if positive, supplying all power energy of the solar cell to the load, and if negative, supplying all power energy of the solar cell to the rechargeable battery; and
    if the power energy of the solar cell is in the "poor" power level range, detecting the reserved power of the rechargeable battery and determining if the reserved power is sufficient to supply the rated power of the load, if the reserved power is sufficient to supply the rechargeable battery, supplying the reserved power of the rechargeable battery to the load by pulse width modulation.

2. The method as claimed in claim 1 further comprising a step of supplying power to the load through an AC mains power supply if determining that the power energy of the solar cell is in the "poor" power level range and the reserved power of the rechargeable battery is insufficient to supply the rated power of the load.

3. The method as claimed in claim 2 further comprising a step of supplying power to the load through the AC mains power supply if determining that the power energy of the solar cell is in the "insufficient" power level range and the reserved power of the rechargeable battery is insufficient to supply the rated power of the load.

4. The method as claimed in claim 1, wherein the intelligent power supply procedure has steps of
    selecting a working cycle, wherein the working cycle is fixed, and the power energy of the solar cell is divided into multiple sections in accordance with the working cycle;
    determining the power energy of the solar cell in each working cycle and equally dividing the power energy in each working cycle to multiple equal parts;
    outputting the rated power from the solar cell to the load, wherein a portion of power energy in each working cycle is acquired and supplied to the load;
    charging the rechargeable battery with the residual power energy, wherein after the power energy in a working cycle is supplied to the load, the residual power energy in the same working cycle is charged to the rechargeable battery;
    detecting and determining the power energy of the solar cell, wherein the power energy of the solar cell is further determined if it is still higher than the rated power of the load, if positive, the intelligent power supply procedure is continuously executed, and if negative, the intelligent power supply procedure is terminated.

5. The method as claimed in claim 2, wherein the intelligent power supply procedure has steps of:
    selecting a working cycle, wherein the working cycle is fixed, and the power energy of the solar cell is divided into multiple sections in accordance with the working cycle;
    determining the power energy of the solar cell in each working cycle and equally dividing the power energy in each working cycle to multiple equal parts;
    outputting the rated power from the solar cell to the load, wherein a portion of power energy in each working cycle is acquired and supplied to the load;
    charging the rechargeable battery with the residual power energy, wherein after the power energy in a working cycle is supplied to the load, the residual power energy in the same working cycle is charged to the rechargeable battery;
    detecting and determining the power energy of the solar cell, wherein the power energy of the solar cell is further determined if it is still higher than the rated power of the load, if positive, the intelligent power supply procedure is continuously executed, and if negative, the intelligent power supply procedure is terminated.

6. The method as claimed in claim 3, wherein the intelligent power supply procedure has steps of:
    selecting a working cycle, wherein the working cycle is fixed, and the power energy of the solar cell is divided into multiple sections in accordance with the working cycle;

determining the power energy of the solar cell in each working cycle and equally dividing the power energy in each working cycle to multiple equal parts;

outputting the rated power from the solar cell to the load, wherein a portion of power energy in each working cycle is acquired and supplied to the load;

charging the rechargeable battery with the residual power energy, wherein after the power energy in a working cycle is supplied to the load, the residual power energy in the same working cycle is charged to the rechargeable battery;

detecting and determining the power energy of the solar cell, wherein the power energy of the solar cell is further determined if it is still higher than the rated power of the load, if positive, the intelligent power supply procedure is continuously executed, and if negative, the intelligent power supply procedure is terminated.

7. The method as claimed in claim 4, wherein if the power energy of the solar cell is in the "moderate" or "sufficient" power level range, the power energy of the solar cell is determined to be sufficient to supply the rated power of the load.

8. The method as claimed in claim 5, wherein if the power energy of the solar cell is in the "moderate" or "sufficient" power level range, the power energy of the solar cell is determined to be sufficient to supply the rated power of the load.

9. The method as claimed in claim 6, wherein if the power energy of the solar cell is in the "moderate" or "sufficient" power level range, the power energy of the solar cell is determined to be sufficient to supply the rated power of the load.

10. The method as claimed in claim 7, wherein if the reserved power of the rechargeable battery is in the "medium" or "high" power level range, the reserved power of the rechargeable battery is determined to be sufficient to supply the rated power of the load.

11. The method as claimed in claim 8, wherein if the reserved power of the rechargeable battery is in the "medium" or "high" power level range, the reserved power of the rechargeable battery is determined to be sufficient to supply the rated power of the load.

12. The method as claimed in claim 9, wherein if the reserved power of the rechargeable battery is in the "medium" or "high" power level range, the reserved power of the rechargeable battery is determined to be sufficient to supply the rated power of the load.

13. The method as claimed in claim 10 further comprising a step of determining if the solar cell has any factor against charging the rechargeable battery if the power energy of the solar cell is in the "poor" power level range and the rechargeable battery is insufficient to supply the rated power of the load, and charging the rechargeable battery with the power energy of the solar cell if the solar cell has none of the factors against charging the rechargeable battery.

14. The method as claimed in claim 11 further comprising a step of determining if the solar cell has any factor against charging the rechargeable battery if the power energy of the solar cell is in the "poor" power level range and the rechargeable battery is insufficient to supply the rated power of the load, and charging the rechargeable battery with the power energy of the solar cell if the solar cell has none of the factors against charging the rechargeable battery.

15. The method as claimed in claim 12 further comprising a step of determining if the solar cell has any factor against charging the rechargeable battery if the power energy of the solar cell is in the "poor" power level range and the rechargeable battery is insufficient to supply the rated power of the load, and charging the rechargeable battery with the power energy of the solar cell if the solar cell has none of the factors against charging the rechargeable battery.

* * * * *